(12) United States Patent
Kalamaras et al.

(10) Patent No.: US 11,300,031 B2
(45) Date of Patent: *Apr. 12, 2022

(54) THERMAL- AND PHOTO-ASSISTED AFTERTREATMENT OF NITROGEN OXIDES

(71) Applicant: Saudi Arabian Oil Company, Dhahran (SA)

(72) Inventors: Christos M. Kalamaras, Al Khobar (SA); Esam Z. Hamad, Dhahran (SA); Remi Mahfouz, Al Khobar (SA); Tamour Javed, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 194 days.

This patent is subject to a terminal disclaimer.

(21) Appl. No.: 16/659,358

(22) Filed: Oct. 21, 2019

(65) Prior Publication Data

US 2021/0115830 A1  Apr. 22, 2021

(51) Int. Cl.
  *F01N 3/10* (2006.01)
  *F01N 3/20* (2006.01)
  *F01N 5/02* (2006.01)

(52) U.S. Cl.
  CPC ............. *F01N 5/025* (2013.01); *F01N 3/101* (2013.01); *F01N 3/2066* (2013.01); *F01N 3/2073* (2013.01); *F01N 3/2086* (2013.01); *F01N 2240/04* (2013.01); *F01N 2370/02* (2013.01); *F01N 2610/04* (2013.01)

(58) Field of Classification Search
  CPC ... F01N 3/0286; F01N 3/0266; F01N 2610/04
  See application file for complete search history.

(56) References Cited

U.S. PATENT DOCUMENTS

| 4,980,040 A | 12/1990 | Lichtin et al. |
| 5,778,664 A | 7/1998 | Janata et al. |
| RE39,720 E | 7/2007 | Murphy et al. |
| 7,488,461 B2 | 2/2009 | Nagayasu et al. |
| 7,498,009 B2 | 3/2009 | Leach et al. |

(Continued)

FOREIGN PATENT DOCUMENTS

| DE | 10142778 | 4/2003 |
| DE | 102017100682 | 7/2017 |

(Continued)

OTHER PUBLICATIONS

PCT International Search Report and Written Opinion issued in International Application No. PCT/US2020/056616 dated Dec. 17, 2020, 17 pages.

(Continued)

*Primary Examiner* — Ngoc T Nguyen
(74) *Attorney, Agent, or Firm* — Fish & Richardson P.C.

(57) ABSTRACT

Systems and methods for treating automotive vehicle emissions on board an automotive vehicle include the use of waste heat recovery, electrochemical water splitting, photocatalytic water splitting, and selective catalytic reduction. Waste heat recovery is used to power electrochemical water splitting, or photocatalytic water splitting. Photons collected from a solar panel are used in photocatalytic water splitting, or in photo-assisted selective catalytic reduction. Hydrogen gas generated by water splitting is used in conjunction with catalytic reduction units to catalytically reduce NOx in an engine exhaust gas.

14 Claims, 9 Drawing Sheets

(56) References Cited

U.S. PATENT DOCUMENTS

| | | |
|---|---|---|
| 8,463,495 B2 | 6/2013 | Spohn et al. |
| 8,741,244 B2 | 6/2014 | Jones |
| 9,664,087 B2 | 5/2017 | Sloss |
| 9,914,094 B2 | 3/2018 | Jenkins et al. |
| 2003/0015413 A1 | 1/2003 | Rising et al. |
| 2004/0187483 A1 | 9/2004 | Dalla Betta |
| 2008/0308405 A1 | 12/2008 | Yu et al. |
| 2009/0193797 A1 | 8/2009 | Wey et al. |
| 2010/0018476 A1 | 1/2010 | Zemskova et al. |
| 2014/0352301 A1 | 12/2014 | Mueller |
| 2017/0122254 A1 | 5/2017 | Urch et al. |
| 2018/0195469 A1 | 7/2018 | Hamad et al. |
| 2020/0102871 A1 | 4/2020 | Sung et al. |
| 2021/0113965 A1 | 4/2021 | Kalamaras et al. |
| 2021/0115827 A1 | 4/2021 | Kalamaras et al. |

FOREIGN PATENT DOCUMENTS

| | | |
|---|---|---|
| DE | 102017106757 | 8/2018 |
| EP | 2821628 | 1/2015 |
| FR | 2941499 | 7/2010 |
| JP | 2015063425 | 4/2015 |
| WO | WO 2018185660 | 10/2018 |

OTHER PUBLICATIONS

Li et al., "Visible Light Driven Z-Scheme Fe2O3/SmFeO3/palygorskite Nanostructure for photo-SCR of Nox," Journal of Taiwan Institute of Chemical Engineers, Jun. 15, 2018, 89: 119-128, 10 pages.

Papailias et al., "Photocatalytic activity of modified g-C3N4/TiO2 nanocomposites for NOx removal," Catalysis Today, Elsevier, Amsterdam, NL, Jun. 2016, 280(5): 37-44, XP029795082, 8 pages.

PCT International Search Report and Written Opinion in International Appln. No. PCT/US2020/056650, dated Feb. 17, 2020, 17 pages.

Orr et al, "A review of car waste heat recovery systems utilising thermoelectric generators and heat pipes," Applied Thermal Engineering, 101, pp. 490-495, Nov. 2015, 6 pages.

PCT International Search Report and Written Opinion in International Appln. No. PCT/US2020/056622, dated Dec. 23, 2020, 16 pages.

THERMAL- AND PHOTO-ASSISTED AFTERTREATMENT OF NITROGEN OXIDES

TECHNICAL FIELD

This document relates to methods and compositions used in treating nitrogen oxides present in automotive vehicle exhaust gas.

BACKGROUND

Automotive engines can produce nitrogen oxides (NOx) during combustion, which are released in the engine exhaust gas. Aftertreatments of the engine exhaust gas are used to reduce the amount these NOx species by converting the NOx into other, less harmful species. Improving the efficiency and effectiveness of these aftertreatments is an important environmental and commercial endeavor.

SUMMARY

This disclosure describes methods and systems for treating automotive vehicle emissions on board an automotive vehicle.

In some implementations, an onboard vehicle emissions treating system includes a waste heat recovery unit configured to mount to an automotive vehicle, and couple to an engine exhaust outlet of the vehicle, and recover energy from an engine exhaust gas emitted by an engine during operation of the vehicle. The system includes an electrochemical cell configured to mount to the vehicle and coupled to the waste heat recovery unit to electrochemically produce a first stream of hydrogen gas utilizing the energy recovered by the waste heat recovery unit. The system includes a selective catalytic reduction unit configured to mount to the vehicle and coupled to the electrochemical cell and to the engine exhaust gas to catalytically reduce NOx in the engine exhaust gas using a first portion of the first stream of hydrogen gas.

This aspect, taken alone or combinable with any other aspect, can include the following features. The electrochemical cell is configured to be coupled to the engine exhaust gas and to receive water recovered from the engine exhaust gas.

This aspect, taken alone or combinable with any other aspect, can include the following features. The system includes a photo-assisted selective catalytic reduction unit configured to mount to the vehicle and coupled to the electrochemical cell to catalytically reduce NOx in the engine exhaust gas, using a second portion of the first stream of hydrogen gas and photons.

This aspect, taken alone or combinable with any other aspect, can include the following features. The system includes a solar panel configured to mount to the automotive vehicle and to collect and transport photons to the photo-assisted selective catalytic reduction unit.

This aspect, taken alone or combinable with any other aspect, can include the following features. The system includes a photocatalytic cell configured to mount to the automotive vehicle and coupled to the waste heat recovery unit. The photocatalytic cell includes an ultraviolet lamp powered by the energy recovered by the waste heat recovery unit. The photocatalytic cell is configured to photocatalytically produce a second stream of hydrogen gas using photons from the ultraviolet lamp. The second stream of hydrogen gas is directed to the selective catalytic reduction unit to catalytically reduce NOx in the engine exhaust gas.

This aspect, taken alone or combinable with any other aspect, can include the following features. The electrochemical cell is configured to be coupled to the engine and to pass a third portion of the first stream of hydrogen gas to the engine.

This aspect, taken alone or combinable with any other aspect, can include the following features. The system is used in conjunction with at least one of a three way catalyst or an ammonia-based selective catalytic reduction unit.

In some implementations, a method for treating automotive vehicle emissions on board a vehicle includes recovering, by a waste heat recovery unit mounted on board the vehicle and coupled to an engine exhaust outlet, energy from an engine exhaust gas generated by the vehicle during vehicle operation. The method includes converting, by a conversion unit mounted on board the vehicle and coupled to the waste heat recovery unit, the recovered energy to electricity. The method includes powering an electrochemical cell coupled to the conversion unit by using the electricity generated by the conversion unit. The method includes producing, by the electrochemical cell coupled to a selective catalytic reduction unit, a first stream of hydrogen gas. The method includes catalytically reducing, by the selective catalytic reduction unit, NOx in the engine exhaust using a first portion of the first stream of hydrogen gas.

This aspect, taken alone or combinable with any other aspect, can include the following features. The method includes producing a first stream of hydrogen gas by directing the first portion of the first stream of hydrogen gas to the selective catalytic reduction unit using a hydrogen flow pathway.

This aspect, taken alone or combinable with any other aspect, can include the following features. Producing a first stream of hydrogen gas includes recovering water from the engine exhaust gas and electrolyzing the water to produce the first stream of hydrogen gas.

This aspect, taken alone or combinable with any other aspect, can include the following features. The method further includes catalytically reducing, by a photo-assisted selective catalytic reduction unit, NOx in the engine exhaust gas, utilizing a second portion of the first stream of hydrogen gas and photons.

This aspect, taken alone or combinable with any other aspect, can include the following features. Catalytically reducing NOx in the engine exhaust gas includes utilizing photons produced by a solar panel mounted to the vehicle and configured to collect and transport photons to the photo-assisted selective catalytic reduction unit.

This aspect, taken alone or combinable with any other aspect, can include the following features. The method includes powering an ultraviolet lamp in a photocatalytic cell using the electricity generated by the conversion unit, wherein the ultraviolet lamp produces photons in response to the powering. The method includes using the photocatalytic cell to produce a second stream of hydrogen gas using the photons. The method includes directing the second stream of hydrogen gas to the selective catalytic reduction unit. The method includes catalytically reducing NOx in the engine exhaust in the selective catalytic reduction unit using the second stream of hydrogen gas.

This aspect, taken alone or combinable with any other aspect, can include the following features. The method includes directing a third portion of the first stream of hydrogen gas to the engine.

In some implementations, an automotive vehicle includes an engine that emits engine exhaust gas during operation of the vehicle. The automotive vehicle includes a waste heat recovery unit mounted to the vehicle and coupled to an engine exhaust outlet, the waste heat recovery unit configured to recover energy from an engine exhaust gas during the operation of the vehicle. The automotive vehicle includes an electrochemical cell mounted to the vehicle, the electrochemical cell coupled to the waste heat recovery unit to electrochemically produce a first stream of hydrogen gas utilizing the energy recovered by the waste heat recovery unit. The automotive vehicle includes a selective catalytic reduction unit mounted to the vehicle, the selective catalytic reduction unit coupled to the electrochemical cell to catalytically reduce NOx in the engine exhaust using a first portion of the first stream of hydrogen gas.

This aspect, taken alone or combinable with any other aspect, can include the following features. The electrochemical cell is further configured to be coupled to the engine exhaust gas and receive water recovered from the engine exhaust gas.

This aspect, taken alone or combinable with any other aspect, can include the following features. The vehicle includes a photo-assisted selective catalytic reduction unit mounted to the vehicle and coupled to the electrochemical cell to catalytically reduce the NOx in the engine exhaust gas, using a second portion of the first stream of hydrogen gas and photons.

This aspect, taken alone or combinable with any other aspect, can include the following features. The vehicle includes a solar panel mounted to the vehicle, the solar panel configured to collect and transport photons to the photo-assisted selective catalytic reduction unit.

This aspect, taken alone or combinable with any other aspect, can include the following features. The vehicle includes a photocatalytic cell mounted to the vehicle and coupled to the waste heat recovery unit. The photocatalytic cell includes an ultraviolet lamp powered by the energy recovered by the waste heat recovery unit and configured to produce photons in response to the powering. The photocatalytic cell is configured to photocatalytically produce a second stream of hydrogen gas using photons from the ultraviolet lamp. The second stream of hydrogen gas is directed to the selective catalytic reduction unit to catalytically reduce NOx in the engine exhaust gas.

This aspect, taken alone or combinable with any other aspect, can include the following features. The electrochemical cell is configured to be coupled to the engine and to pass a third portion of the first stream of hydrogen gas to the engine.

This aspect, taken alone or combinable with any other aspect, can include the following features. The vehicle includes at least one of a three way catalyst or an ammonia-based selective catalytic reduction unit.

This aspect, taken alone or combinable with any other aspect, can include the following features. In some implementations, an onboard automotive vehicle emissions treating system includes a solar panel configured to mount to an automotive vehicle, the solar panel configured to convert solar energy into electricity. The system includes an electrochemical cell configured to mount to the vehicle and coupled to the solar panel to produce a first stream of hydrogen gas using the electricity from the solar panel. The system includes a selective catalytic reduction unit configured to mount to the vehicle and coupled to the electrochemical cell to use a first portion of the hydrogen gas to catalytically reduce NOx in an engine exhaust gas emitted by an engine of the vehicle during operation of the vehicle.

This aspect, taken alone or combinable with any other aspect, can include the following features. The electrochemical cell is further configured to be coupled to the engine exhaust gas and receive water recovered from the engine exhaust gas.

This aspect, taken alone or combinable with any other aspect, can include the following features. The solar panel includes solar to electricity conversion materials.

This aspect, taken alone or combinable with any other aspect, can include the following features. The system includes a photo-assisted selective catalytic reduction unit coupled to the electrochemical cell and configured to catalytically reduce NOx in the engine exhaust gas using a second portion of the hydrogen gas and photons collected by the solar panel.

This aspect, taken alone or combinable with any other aspect, can include the following features. The electrochemical cell is configured to be coupled to the engine of the vehicle and to direct a third portion of the first stream of hydrogen gas to the engine of the vehicle.

This aspect, taken alone or combinable with any other aspect, can include the following features. The system is used in conjunction with at least one of a three way catalyst or an ammonia-based selective catalytic reduction unit.

In some implementations, a method for treating automotive vehicle emissions on-board an automotive vehicle includes collecting, by a solar panel on the vehicle, solar energy. The method includes converting, by a photovoltaic cell, the solar energy into electricity. The method includes powering the electrochemical cell by the electricity from the photovoltaic cell. The method includes producing, by the electrochemical cell, a first stream of hydrogen gas. The method includes catalytically reducing, by a selective catalytic reduction unit, NOx in an engine exhaust gas using a first portion of the first stream of hydrogen gas.

This aspect, taken alone or combinable with any other aspect, can include the following features. Producing the first stream of hydrogen gas further includes recovering water from the engine exhaust gas and electrolyzing the water to produce the first stream of hydrogen gas.

This aspect, taken alone or combinable with any other aspect, can include the following features. Collecting solar energy by the solar panel includes collecting solar energy by electricity conversion materials in the solar panel.

This aspect, taken alone or combinable with any other aspect, can include the following features. The method includes directing a second portion of the first stream of hydrogen gas to a photo-assisted selective catalytic reduction unit coupled to the electrochemical cell and catalytically reducing NOx in the engine exhaust using the second portion of the hydrogen gas and photons collected by the solar panel.

This aspect, taken alone or combinable with any other aspect, can include the following features. The method includes directing a third portion of the first stream of hydrogen gas to an engine of the vehicle.

In some implementations, an automotive vehicle includes an engine that emits engine exhaust gas during operation of the vehicle. The automotive vehicle includes a solar panel mounted to the vehicle, the solar panel configured to convert solar energy into electricity. The automotive vehicle includes an electrochemical cell mounted to the vehicle and coupled to the solar panel, the electrochemical cell configured to produce hydrogen gas using the electricity from the solar panel. The automotive vehicle includes a selective catalytic reduction unit mounted to the vehicle, the selective catalytic reduction unit coupled to the electrochemical cell to catalytically reduce NOx in the engine exhaust gas using a first portion of the first stream of hydrogen gas.

This aspect, taken alone or combinable with any other aspect, can include the following features. The electrochemical cell is further configured to be coupled to the engine exhaust gas and to receive water recovered from the engine exhaust gas.

This aspect, taken alone or combinable with any other aspect, can include the following features. The solar panel further includes solar to electricity conversion materials.

This aspect, taken alone or combinable with any other aspect, can include the following features. The vehicle includes a photo-assisted selective catalytic reduction unit coupled to the electrochemical cell and configured to catalytically reduce NOx in the engine exhaust gas using a second portion of the hydrogen gas and photons collected by the solar panel.

This aspect, taken alone or combinable with any other aspect, can include the following features. The electrochemical cell is configured to be coupled to an engine of the vehicle and to direct a third portion of the first stream of hydrogen gas to the engine of the vehicle.

This aspect, taken alone or combinable with any other aspect, can include the following features. The vehicle includes at least one of a three way catalyst or an ammonia-based selective catalytic reduction unit.

In some implementations, an onboard automotive vehicle emissions treating system includes a solar panel configured to mount to an automotive vehicle and configured to collect photons. The system includes a plurality of fiber optics configured to mount to the vehicle and coupled to the solar panel to transport photons. The system includes a photocatalytic cell configured to mount to the vehicle, the photocatalytic cell coupled to the plurality of fiber optics to receive the first portion of the photons, and produce a first stream of hydrogen gas using the first portion of the photons. The system includes a photo-assisted selective catalytic reduction unit configured to mount to the vehicle and coupled to the photocatalytic cell, configured to receive a first portion of the first stream of hydrogen gas produced by the photocatalytic cell and the first portion of the photons, and catalytically reduce NOx in an engine exhaust gas emitted by an engine during operation of the vehicle, using the first portion of the first stream of hydrogen gas and a second portion of the photons.

This aspect, taken alone or combinable with any other aspect, can include the following features. The photocatalytic cell includes electrodes, wherein the electrodes are connected to the waste heat recovery unit.

This aspect, taken alone or combinable with any other aspect, can include the following features. The photocatalytic reactor is configured to decompose NOx in the engine exhaust gas using the third portion of the photons.

This aspect, taken alone or combinable with any other aspect, can include the following features. The system includes a photocatalytic reactor configured to oxidize NOx in the engine exhaust gas using a third portion of the photons.

This aspect, taken alone or combinable with any other aspect, can include the following features. The photocatalytic reactor includes a selective photocatalyst.

This aspect, taken alone or combinable with any other aspect, can include the following features. The selective photocatalyst of is at least one of $TiO_2$, ZnO, or $C_3N_4$.

This aspect, taken alone or combinable with any other aspect, can include the following features. The photocatalytic cell is configured to be coupled to the engine and to direct a third portion of the first stream of hydrogen gas to the engine.

This aspect, taken alone or combinable with any other aspect, can include the following features. The system is used in conjunction with at least one of a three way catalyst or an ammonia-based selective catalytic reduction unit.

In some implementations, a method of treating automotive vehicle emissions on board an automotive vehicle includes collecting, by a solar panel mounted on board the vehicle and coupled to a photocatalytic cell and to a photo-assisted selective catalytic reduction unit by fiber optics, photons. The method includes directing, by the fiber optics, a first portion of the photons to the photocatalytic cell and a second portion of the photons to the photo-assisted selective catalytic reduction unit. The method includes generating, by the photocatalytic cell coupled to the photo-assisted selective catalytic unit, a first stream of hydrogen gas. The method includes catalytically reducing, by the photo-assisted selective catalytic reduction unit, NOx in an engine exhaust gas using a first portion of the hydrogen gas and a second portion of the photons.

This aspect, taken alone or combinable with any other aspect, can include the following features. Generating the first stream of hydrogen gas by the photocatalytic cell further comprises generating the first stream of hydrogen gas by a photocatalytic cell comprising electrodes connected to the waste heat recovery unit.

This aspect, taken alone or combinable with any other aspect, can include the following features. The method includes decomposing, by a photocatalytic reactor, NOx in the engine exhaust gas using a second portion of the photons.

This aspect, taken alone or combinable with any other aspect, can include the following features. The method includes oxidizing, by a photocatalytic reactor, NOx in the engine exhaust gas using a third portion of the photons.

This aspect, taken alone or combinable with any other aspect, can include the following features. Oxidizing the NOx further comprises using a selective photocatalyst selected from a group including $TiO_2$, ZnO, or $C_3N_4$.

This aspect, taken alone or combinable with any other aspect, can include the following features. The method includes directing, by a hydrogen flow pathway, a second portion of the hydrogen gas to the engine.

In some implementations, an automotive vehicle includes an engine that emits engine exhaust gas during operation of the vehicle. The vehicle includes a solar panel mounted to the vehicle and configured to collect photons. The vehicle includes a plurality of fiber optics mounted to the vehicle and configured to couple to the solar panel to transport photons. The vehicle includes a photocatalytic cell mounted to the vehicle and configured to couple to the plurality of fiber optics to receive the first portion of the photons, and produce a first stream of hydrogen gas using the first portion of the photons. The vehicle includes a photo-assisted selective catalytic reduction unit mounted to the vehicle and coupled to the photocatalytic cell to receive a first portion of the first stream of hydrogen gas produced by the photocatalytic cell and receive a second portion of the photons, and to catalytically reduce NOx in an engine exhaust gas emitted by the engine during operation of the vehicle, using the first portion of the first stream of hydrogen gas and the second portion of the photons.

This aspect, taken alone or combinable with any other aspect, can include the following features. The photocatalytic cell includes electrodes, wherein the electrodes are connected to the waste heat recovery unit.

This aspect, taken alone or combinable with any other aspect, can include the following features. The vehicle includes a photocatalytic reactor coupled to the photocatalytic cell and configured to oxidize NOx in the engine exhaust gas using a third portion of the photons.

This aspect, taken alone or combinable with any other aspect, can include the following features. The photocatalytic reactor includes a selective photocatalyst.

This aspect, taken alone or combinable with any other aspect, can include the following features. The selective photocatalyst is at least one of TiO2, ZnO, or $C_3N_4$.

This aspect, taken alone or combinable with any other aspect, can include the following features. The photocatalytic reactor is configured to decompose NOx in the engine exhaust gas using the third portion of the photons.

This aspect, taken alone or combinable with any other aspect, can include the following features. The photocatalytic cell is configured to be coupled to the engine and to direct a third portion of the first stream of hydrogen gas to the engine.

This aspect, taken alone or combinable with any other aspect, can include the following features. The vehicle includes at least one of a three way catalyst or an ammonia-based selective catalytic reduction unit.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Provided in this disclosure, in part, are methods and systems for treating automotive vehicle emissions on board an automotive vehicle, where the emissions are produced during operation of the engine.

A system for treating automotive vehicle emissions can be on board the automotive vehicle. For example, the entire system can be configured such that the system is contained on or within the automotive vehicle. The system therefore travels with the automotive vehicle and can be used while the vehicle is in operation.

Figure 1:
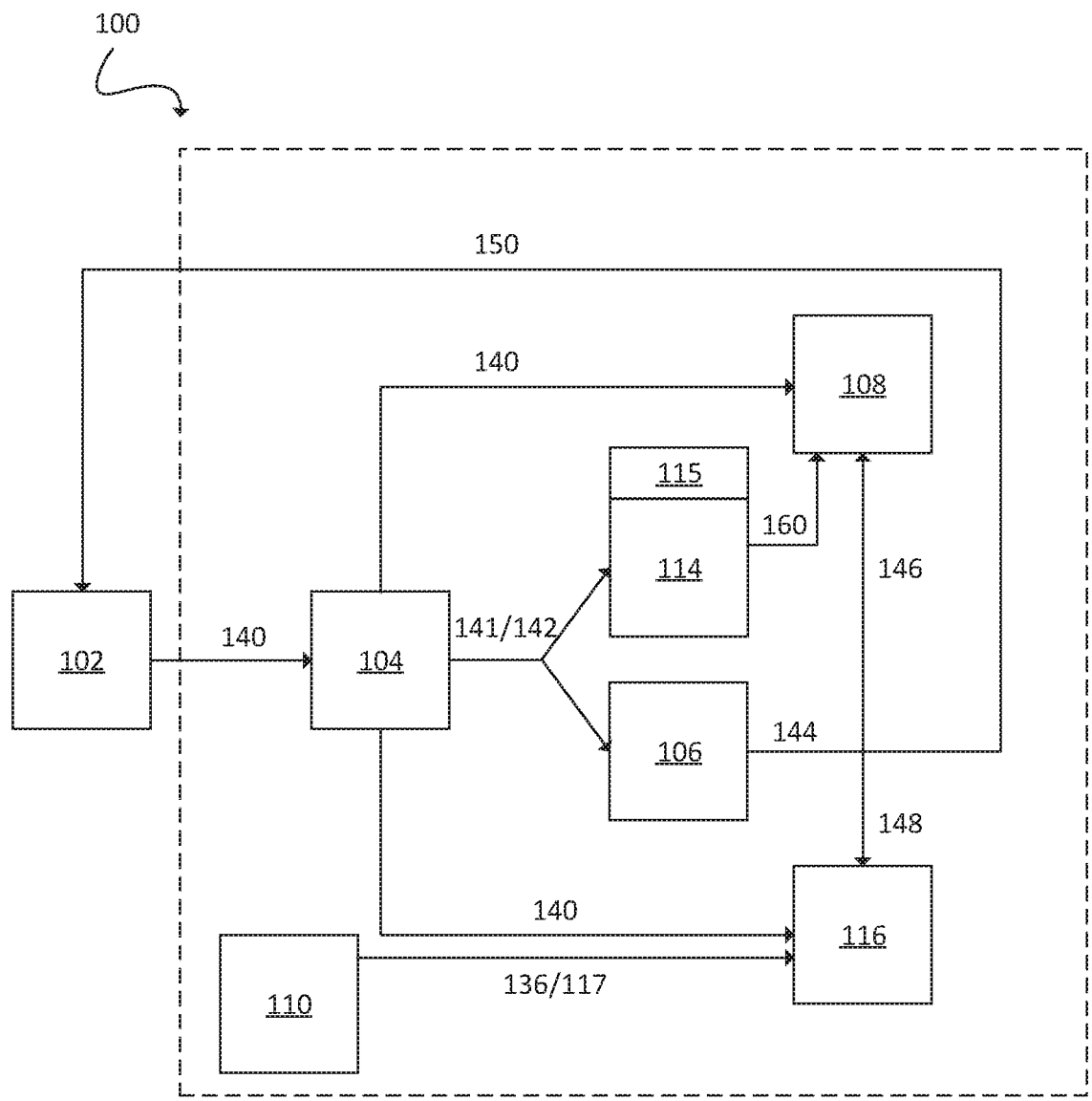
FIG. 1 shows an example schematic of a system for treating automotive vehicle emissions.

FIG. 1 shows an example of a system 100 for treating automotive vehicle emissions on board an automotive vehicle. In some implementations, the system includes a waste heat recovery unit 104, an electrochemical cell 106, and a selective catalytic reduction unit 108. The waste heat recovery unit 104 is coupled to the engine exhaust gas 140 of a vehicle and configured to recovery energy 142 from the engine exhaust. For example, the heat of the engine itself can be recovered and converted into electricity. Any type of waste heat recovery unit suitable for recovering energy from the engine exhaust gas can be used in the system 100. For example, thermoelectric conversion or turbocompounding can be used in the system 100. The recovered energy or electricity can be used to power other units or processes in the system. The waste heat recovery unit 104 can also be coupled to the electrochemical cell 106 and energy from the waste heat recovery unit 204 can be used to power the electrochemical cell 106. The electrochemical cell 106 can include electrodes. The electrodes can be connected to the waste heat recovery unit 104, for example, by copper wires 141. The electrochemical cell can be powered entirely by the recovered energy 142 or powered partially by the recovery energy 142.

The electrochemical cell 106 is configured to be coupled to the waste heat recovery unit 104 as well as to the selective catalytic reduction unit 108. The electrochemical cell 106 is configured to produce a first stream of hydrogen gas 144. For example, the electrochemical cell 106 can produce the first stream of hydrogen gas 144 by the electrolysis of water, which generates hydrogen gas and oxygen gas. The water can be recovered or condensed from the engine exhaust gas 140 or supplied via an auxiliary water tank that can be filled by the end-user. The electrochemical cell can utilize the energy 142 recovered by the waste heat recovery unit 104. The electrochemical cell can be configured to direct a first portion 146 of the first stream of hydrogen gas to the selective catalytic reduction unit 108. The electrochemical cell 106 can also be configured to direct a second portion 148 of the first stream of hydrogen gas to a photo-assisted selective catalytic reduction unit 116. The electrochemical cell can also be configured to direct a third portion 150 of the first stream of hydrogen gas to the automotive engine 102. The hydrogen stream is first mixed with hydrocarbon fuel vapors and then injected into a combustion chamber of the engine 102. The electrochemical cell 106 produces a high purity stream of hydrogen gas through electrolysis of water. This system can be coupled to engines that operate on spark ignition or engines that operate on compression ignition. In automotive vehicles with a spark ignition engine, adding hydrogen to the engine, for example, to the combustion chamber, improves the overall efficiency, smooths engine operation, and lowers engine out emissions. In automotive vehicles with compression ignition engines, adding hydrogen to the engine, for example to the combustion chamber, can reducing the amount of NOx and soot in emissions or promote the auto-ignition of non-diesel fuels, for example gasoline.

The selective catalytic reduction unit 108 is configured to be coupled to the electrochemical cell 106 and to the engine exhaust gas 140. The selective catalytic reduction (SCR) unit 108 can be configured to use the first portion 146 of the first stream of hydrogen gas to catalytically reduce NOx in the engine exhaust gas 140, a process which generates nitrogen gas ($N_2$) and water. This results in a cleaner engine exhaust gas and reduces the amount of pollutants emitted by the automotive engine.

In some embodiments, the system includes a photo-assisted selective catalytic reduction (SCR) unit 116. The photo-assisted SCR unit 116 can be configured to be coupled to the electrochemical cell 106 and to the engine exhaust gas 140. The engine exhaust gas 140 and the first hydrogen stream 144 produced from the electrochemical cell 106 feed the photo-assisted SCR unit, where the conversion of NOx take place in the presence of photo-catalytic materials. The process is driven by photons (UV/Vis light) using hydrogen as the reducing agent, compared to the conventional SCR unit which is powered by heat and the reducing agent is ammonia. The photo-assisted SCR unit 116 is configured to catalytically reduce NOx in the engine exhaust gas 140 using a second portion 148 of the first stream of hydrogen gas and photons 136. In some implementations, the photons 136 are supplied by fiber optics 137 that are in communication with a solar panel 110 on the automotive vehicle. The solar panels can be mounted on the car in several ways, for example by replacing the sunroof with solar panels, or by coating the sunroof with solar to electricity conversion materials. Solar to electricity conversion materials could also be applied to all other windows on the vehicle.

In some implementations, the system 100 also includes a photocatalytic cell 114 configured to be coupled to the waste heat recovery unit 104 and to the photo-assisted SCR unit 116. The photocatalytic cell 114 is configured to utilize the energy from the waste heat recovery unit 142 to photocatalytically produce a second stream of hydrogen gas 160. The photocatalytic cell 114 can include a container made of glass or plastic. The photocatalytic cell 114 can be configured to hold water. The photocatalytic cell 114 has two electrodes, a cathode and an anode. The electrode can include, for example, platinum, stainless steel, or iridium. The electrodes can be connected to the waste heat recovery unit by copper wires 141 that supply the recovered energy 142 to the photocatalytic cell 114. The gasses produced by the photocatalytic cell, $H_2$ and $O_2$, can be transmitted directly to the selective catalytic reduction unit 108, for example by using stainless steel piping, or by using a pump to control the gas flow needed by the selective catalytic reduction unit 108. The energy from the waste heat recovery unit can be used to power an ultraviolet lamp 115. The ultraviolet lamp 115 can also provide UV/Vis light to the photo-assisted SCR unit 116. The ultraviolet lamp 115 can be powered entirely or partially by energy from the waste heat recovery unit. Powering the ultraviolet lamp results in the production of photons. The photons photocatalytically split water to produce hydrogen gas and oxygen gas.

The second stream of hydrogen gas 160 can be directed to the SCR unit 116 and used to catalytically reduce NOx in the engine exhaust gas 140.

In some implementations, the system 100 is used in conjunction with another aftertreatment system on board the automotive vehicle. For example, the system 100 can be used in conjunction with an existing three way catalyst (TWC). Three way catalysts are used to reduce NOx emissions in spark ignition vehicles, but exhibit reduced efficiency in NOx reduction during lean conditions (for example, when there is an excess of air in the combustion chamber). Therefore the combination of the system 100 with a TWC results in improved NOx reduction. Alternatively, the system 100 can be used in conjunction with an ammonia-based selective catalytic reduction unit. Ammonia-based selective catalytic reduction units are also used to reduce NOx, however, these units have reduced efficiency at low temperatures and suffer from ammonia slip, where excess ammonia remains after catalytic reduction. Accordingly, a combination of ammonia-based selective catalytic reduction units with the system 100 can improve NOx reduction. As a third alternative, some embodiments of the system 100 can completely replace existing aftertreatment systems in automotive vehicles.

Figure 3:
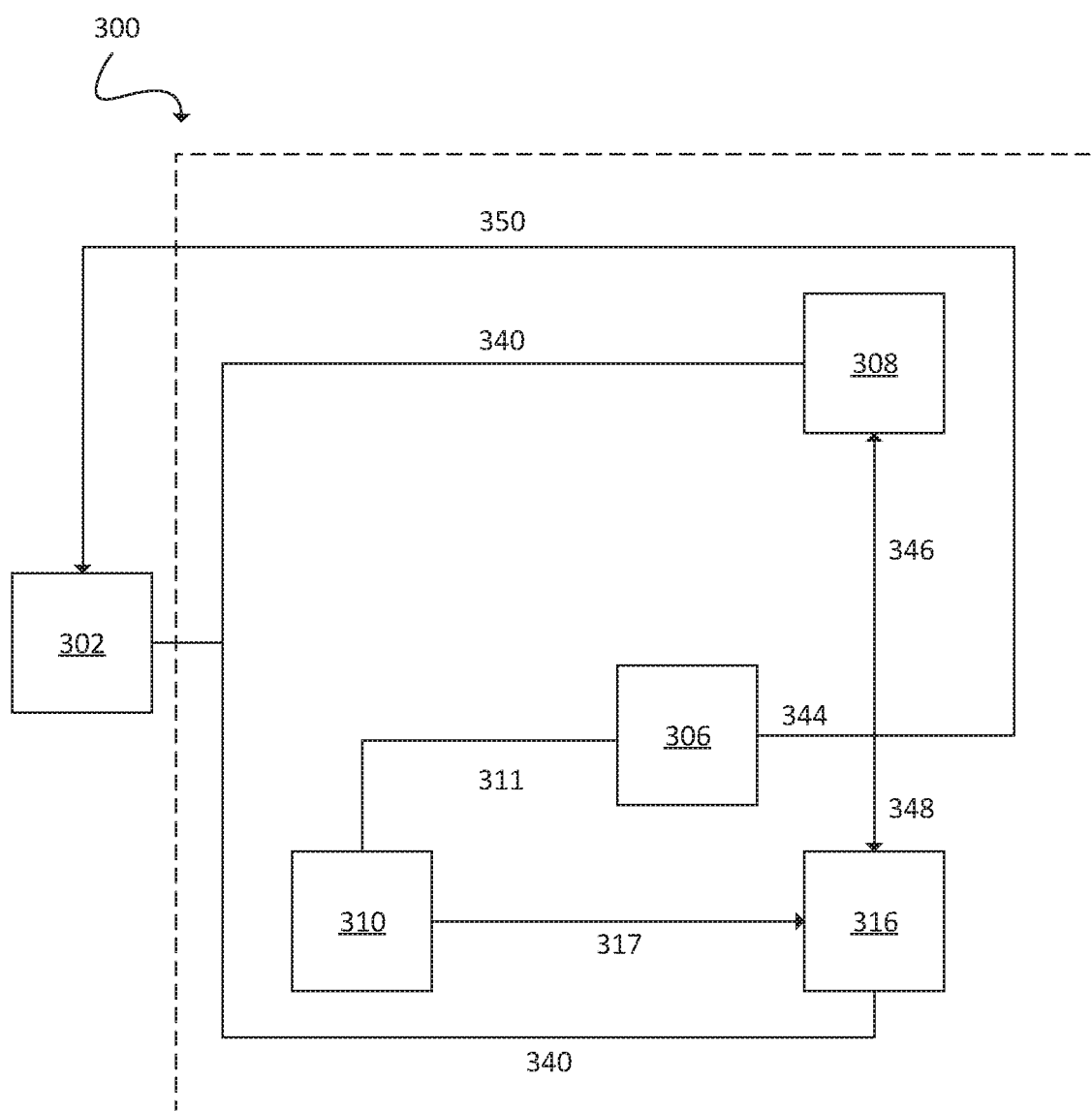
FIG. 3 shows an example schematic of a system for treating automotive vehicle emissions.
Figure 5:
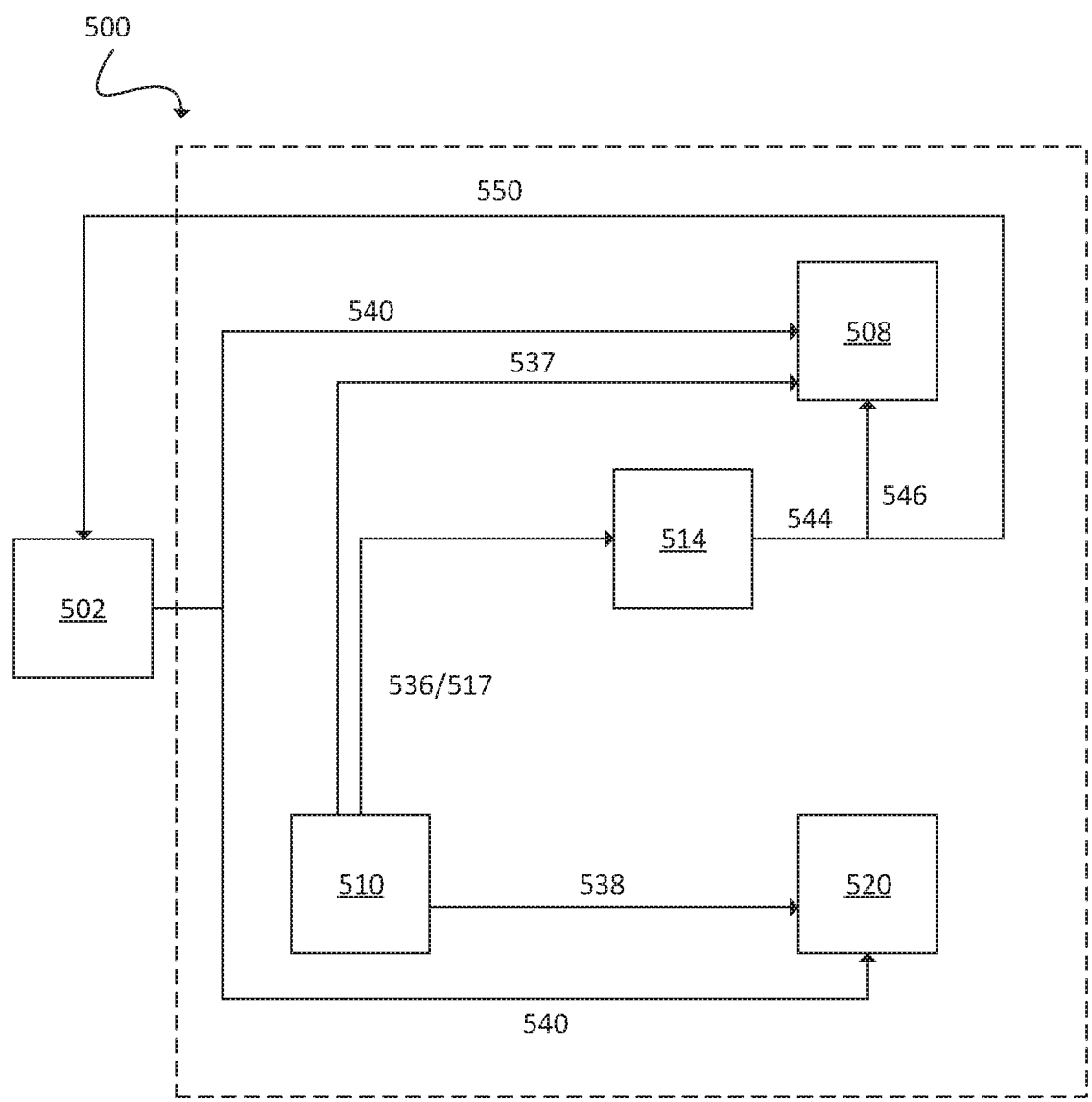
FIG. 5 shows an example schematic of a system for treating automotive vehicle emissions.

The units described above can be used in different combinations on board an automotive vehicle to treat the vehicle emissions. Units described in FIG. 3 and FIG. 5 are substantially similar or identical to units with corresponding reference numbers described in FIG. 1. The structural details, gas flow pathways, and methods of attachment of units described in FIG. 3 and FIG. 5 are substantially similar or identical to units with corresponding reference numbers described in FIG. 1.

Figure 2:
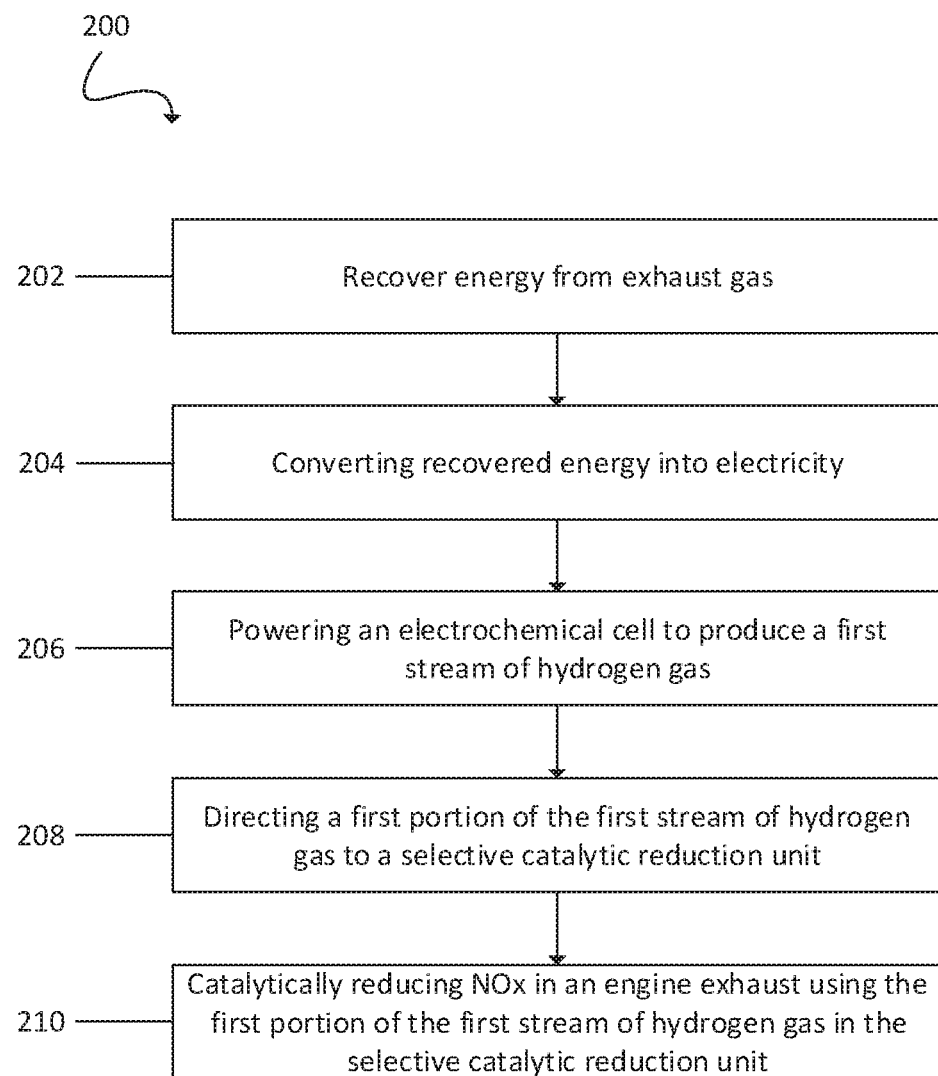
FIG. 2 is a flowchart of an example method for treating automotive vehicle emissions.

FIG. 2 is an example of a method 200 for treating automotive vehicle emissions on board a vehicle. At 202, energy is recovered from an engine exhaust gas using a waste heat recovery unit and the recovered energy is converted into electricity at 204, for example by using a conversion unit, for example, by using a thermoelectric generator. At 206, the electricity is used to power an electrochemical cell and produce a first stream of hydrogen gas. The electrochemical cell can produce a first stream of hydrogen gas 144, for example by electrochemical splitting of water. At 208, a first portion of the first stream of the hydrogen gas is directed to a selective catalytic reduction (SCR) unit. At 210, the SCR unit 108 then catalytically reduces NOx in the engine exhaust gas.

FIG. 3 illustrates a system 300 for the treatment of automotive vehicle emissions on board an automotive vehicle. The system 300 can include a solar panel 310, an electrochemical cell 306, and a selective catalytic reduction (SCR) unit 308. In some implementations, the solar panel is on automotive vehicle and configured to collect solar energy. The solar panel 310 can be on the exterior of the vehicle, for example on the roof of the vehicle. The solar panel 310 can be configured to convert solar energy into electricity 311. For example, the solar panel can be configured to convert the solar energy into electricity by using one or more photovoltaic cells. The solar panel can be coupled to the electrochemical cell 306.

In some implementations, the electrochemical cell 306 can be coupled to the solar panel and to the SCR unit 308. The electrochemical cell 306 is configured to produce a first stream of hydrogen gas 344 using the electricity from the solar panel. For example, the electrochemical cell 306 can produce the first stream of hydrogen gas 144 by splitting water, which produces hydrogen gas and oxygen. The electrochemical cell 306 can also be configured to direct a first portion 346 of the first stream of hydrogen gas to the SCR unit 308. The electrochemical cell can also direct a second portion 348 of the first stream of hydrogen gas to a photo-assisted selective catalytic reduction unit 316, and a third portion 350 of the first stream of hydrogen gas to an engine of the automotive vehicle. This system can be coupled to engines that operate on spark ignition or engines that operate on compression ignition. In automotive vehicles with a spark ignition engine, adding hydrogen to the engine, for example to the combustion chamber of the engine, improves the overall efficiency, smooths engine operation, and lowers engine out emissions. In automotive vehicles with compression ignition engines, adding hydrogen to the engine, for example to the combustion chamber of the engine, can reducing the amount of NOx and soot in emissions or promote the auto-ignition of non-diesel fuels, for example gasoline.

In some implementations, the SCR unit 308 can be coupled to the electrochemical cell 306 and to an engine exhaust gas 340 emitted by the engine of the automotive vehicle during operation of the automotive vehicle. The SCR unit 308 is configured to catalytically reduce NOx in the engine exhaust gas 340 using the first portion 346 of the first stream of hydrogen gas.

In some implementations, the system 300 includes a photo-assisted selective catalytic reduction (SCR) unit 316. The photo-assisted SCR unit 316 can be coupled to the electrochemical cell 306 and to the engine exhaust gas 340. The photo-assisted SCR 316 is configured to catalytically reduce NOx in the engine exhaust gas 340 using a second portion 348 of the hydrogen gas and photons. The photons can be supplied be collected by the solar panel 310 and directed to the photo-assisted SCR 316 using fiber optics 317. The solar panel 310 can be on the exterior of the vehicle, for example on the roof of the vehicle.

In some implementations, the system 300 is used in conjunction with another aftertreatment system on board the automotive vehicle. For example, the system 300 can be used in conjunction with an existing three way catalyst (TWC). Alternatively, the system 300 can be used in conjunction with an ammonia-based selective catalytic reduction unit. As a third alternative, some embodiments of the system 300 can completely replace existing aftertreatment systems in automotive vehicles.

Figure 4:
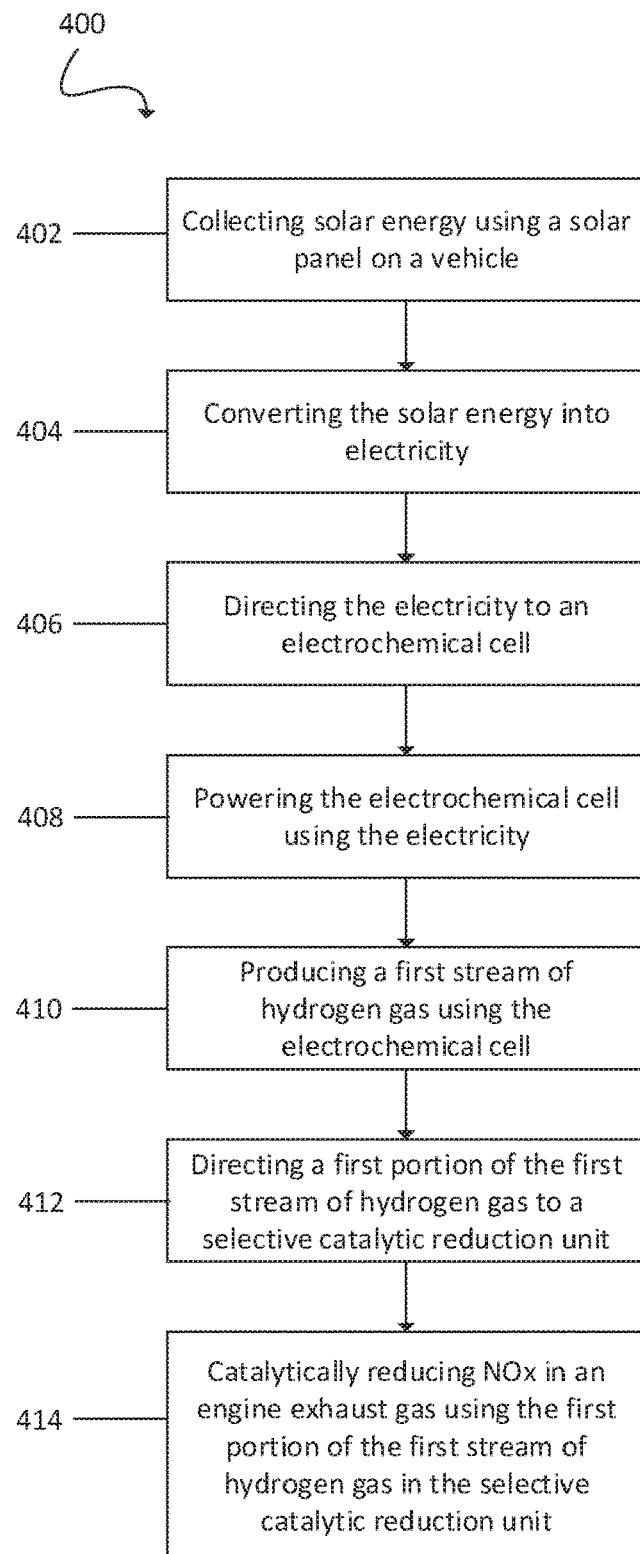
FIG. 4 is a flowchart of an example method for treating automotive vehicle emissions.

FIG. 4 is a flowchart of an example method 400 for treating automotive vehicle emissions on-board an automotive vehicle. At 400, solar energy is collected using a solar panel on the vehicle. At 404, the solar energy is converted into electricity. At 406, the electricity is directed to an electrochemical cell. At 408, the electrochemical cell is powered using the electricity. At 410, the electrochemical cell produces a first stream of hydrogen gas. At 412, a first portion of the first stream of hydrogen gas is directed to an SCR unit, and at 414 the SCR unit uses the first portion of the first stream of hydrogen gas to catalytically reduce NOx in an engine exhaust gas.

FIG. 5 illustrates a system 500 for treating automotive vehicle emissions on board an automotive vehicle. The system 500 includes a solar panel 510, a photocatalytic cell 514, and a photo-assisted selective catalytic reduction (SCR) unit 508. In some implementations, the solar panel 510 is on the vehicle and configured to be coupled to the photocatalytic cell 514. The solar panel can be on the exterior of the vehicle, for example on the roof of the vehicle. The solar panel is configured to collect photons and can transport a first portion 536 of the photons to the photocatalytic cell 514 using fiber optics 517. The solar panel can be configured to transport a second portion 537 to the selective catalytic reduction unit 508. The solar panel can be configured to transport a third portion 538 of the photons to a photocatalytic reactor 520.

In some implementations, the photocatalytic cell 514 is configured to use the first portion 536 of photons to produce a first stream of hydrogen gas 544. For example, the photocatalytic cell 514 can be configured to produce the first stream of hydrogen gas 544 by photocatalytically splitting water, which produces hydrogen gas and oxygen gas. In some implementations, the photocatalytic cell is configured to direct a first portion 546 of the first stream of hydrogen gas to the photo-assisted SCR unit 508.

The photo-assisted SCR unit 508 can be coupled to the photocatalytic cell 514 and to the engine exhaust gas 540. The photo-assisted SCR unit 508 is configured to catalytically reduce NOx in the engine exhaust gas 540 using the first portion of the first stream of hydrogen gas and the second portion 537 of the photons.

In some implementations, the system 500 further includes a photocatalytic reactor 520. The photocatalytic reactor 520 can be coupled to the solar panel 510 and to the engine exhaust gas 540. The photocatalytic reactor 520 is configured to oxidize NOx in the engine exhaust gas using a third portion 538 of the photons.

In some implementations, the photocatalytic reactor 520 includes a selective photocatalyst. For example, the photocatalyst can be $TiO_2$, $ZnO$, $C_3N_4$, a perovskite, a zeolite, or other suitable catalysts.

In some implementations, the photocatalytic reactor 520 can be configured to decompose NOx in the engine exhaust gas 540 using a third portion of the photons 538, resulting in nitrogen gas and oxygen gas.

In some implementations, the photocatalytic cell is configured to be coupled to the engine 502 and to direct a second portion 550 of the first stream of hydrogen gas to the engine. This system can be coupled to engines that operate on spark ignition or engines that operate on compression ignition. In automotive vehicles with a spark ignition engine, adding hydrogen to the engine, for example to the combustion chamber of the engine, improves the overall efficiency, smooths engine operation, and lowers engine out emissions. In automotive vehicles with compression ignition engines, adding hydrogen to the engine, for example to the combustion chamber of the engine, can reduce the amount of NOx and soot in emissions or promote the auto-ignition of non-diesel fuels, for example gasoline.

In some implementations, the system 500 can be used in conjunction with another existing engine exhaust aftertreatment, for example a TWC or ammonia based SCR. As a third alternative, some embodiments of the system 500 can completely replace existing aftertreatment systems in automotive vehicles.

Figure 6:
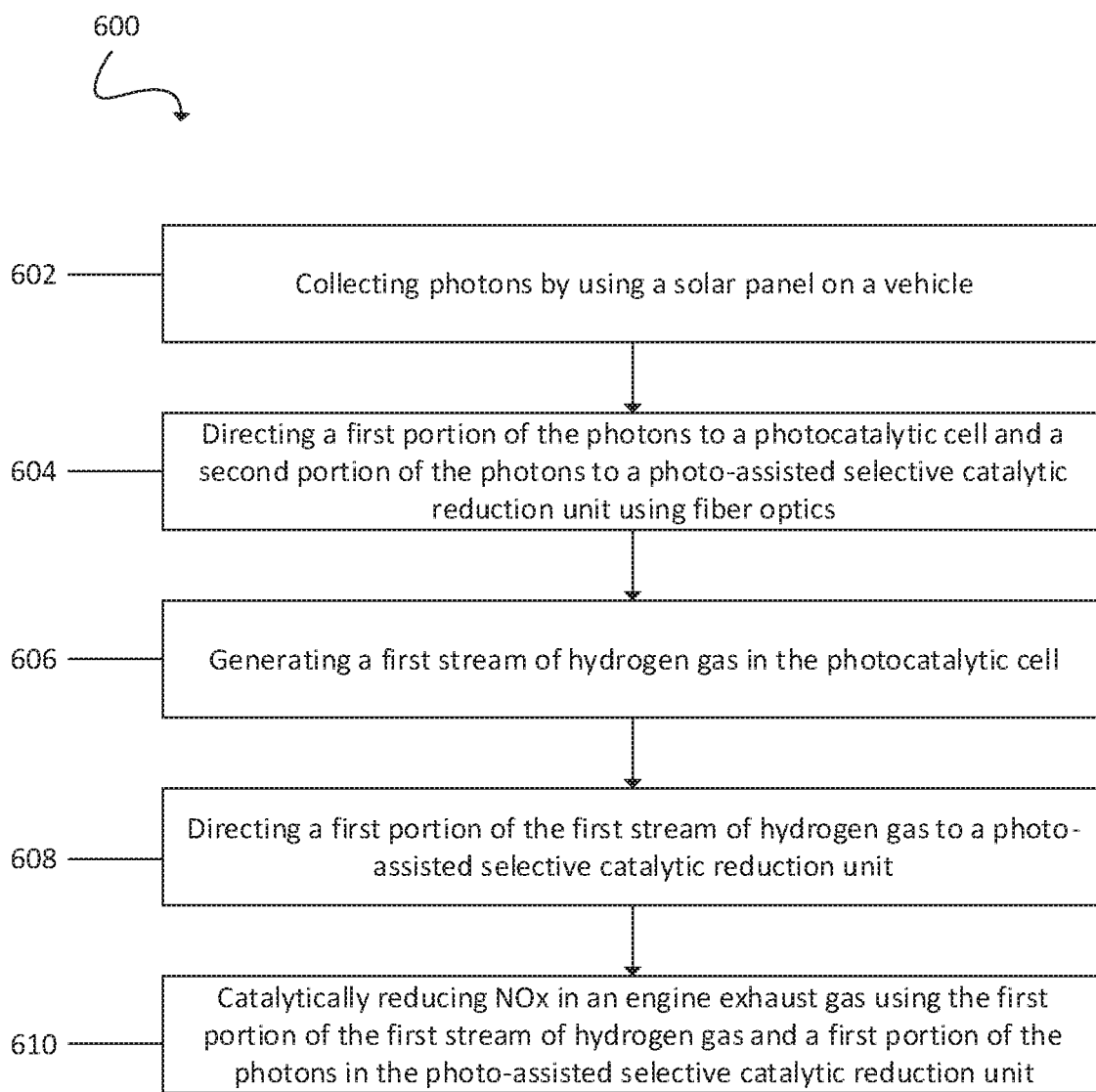
FIG. 6 is a flowchart of an example method for treating automotive vehicle emissions.

FIG. 6 is a flow chart of an example method for treating automotive vehicle emissions on board a vehicle. At 602, photons are collected by a solar panel on the vehicle. At 604, a first portion of the photons are directed to the photocatalytic cell and a second portion of the photons are directed to a photo-assisted selective catalytic reduction unit using fiber optics. At 606, a first stream of hydrogen gas is generated in the photocatalytic cell using the first portion of the photons. At 608, a first portion of the first stream of the hydrogen gas is directing directed to the photo-assisted SCR unit. At 610, the photo-assisted SCR unit then catalytically reduces NOx in an engine exhaust gas using the first portion of the hydrogen gas and a first portion of the photons.

Figure 7A:
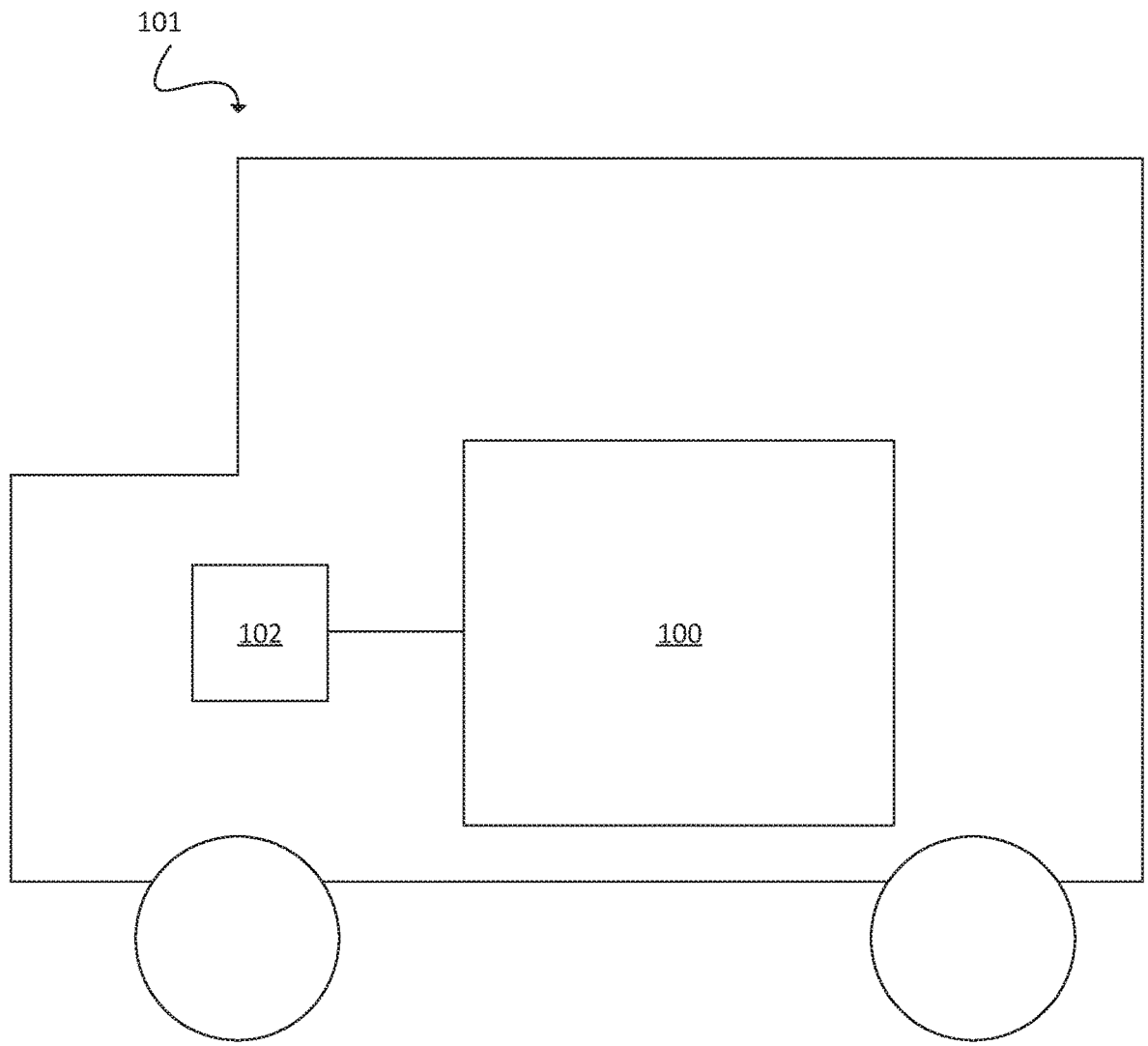
FIG. 7A shows an example schematic of an automobile with an engine and a system for treating automotive vehicle emissions.

FIG. 7A illustrates an automotive vehicle 101 with an engine 102 and the system 100 for treating automotive vehicle emissions on board an automotive vehicle.

Figure 7B:
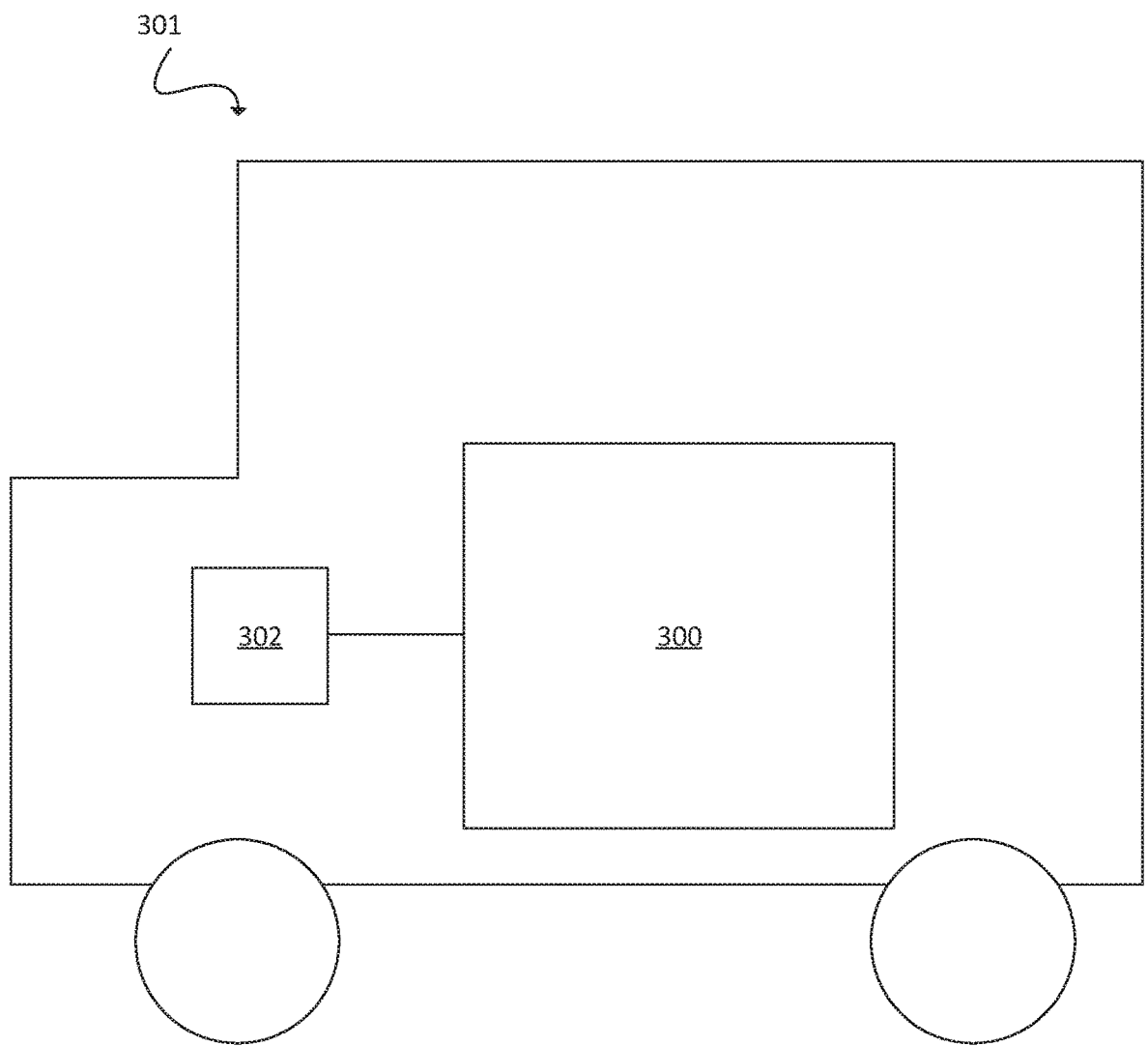
FIG. 7B shows an example schematic of an automobile with an engine and a system for treating automotive vehicle emissions.

FIG. 7B illustrates an automotive vehicle 301 with an engine 302 and the system 300 for treating automotive vehicle emissions on board an automotive vehicle.

Figure 7C:
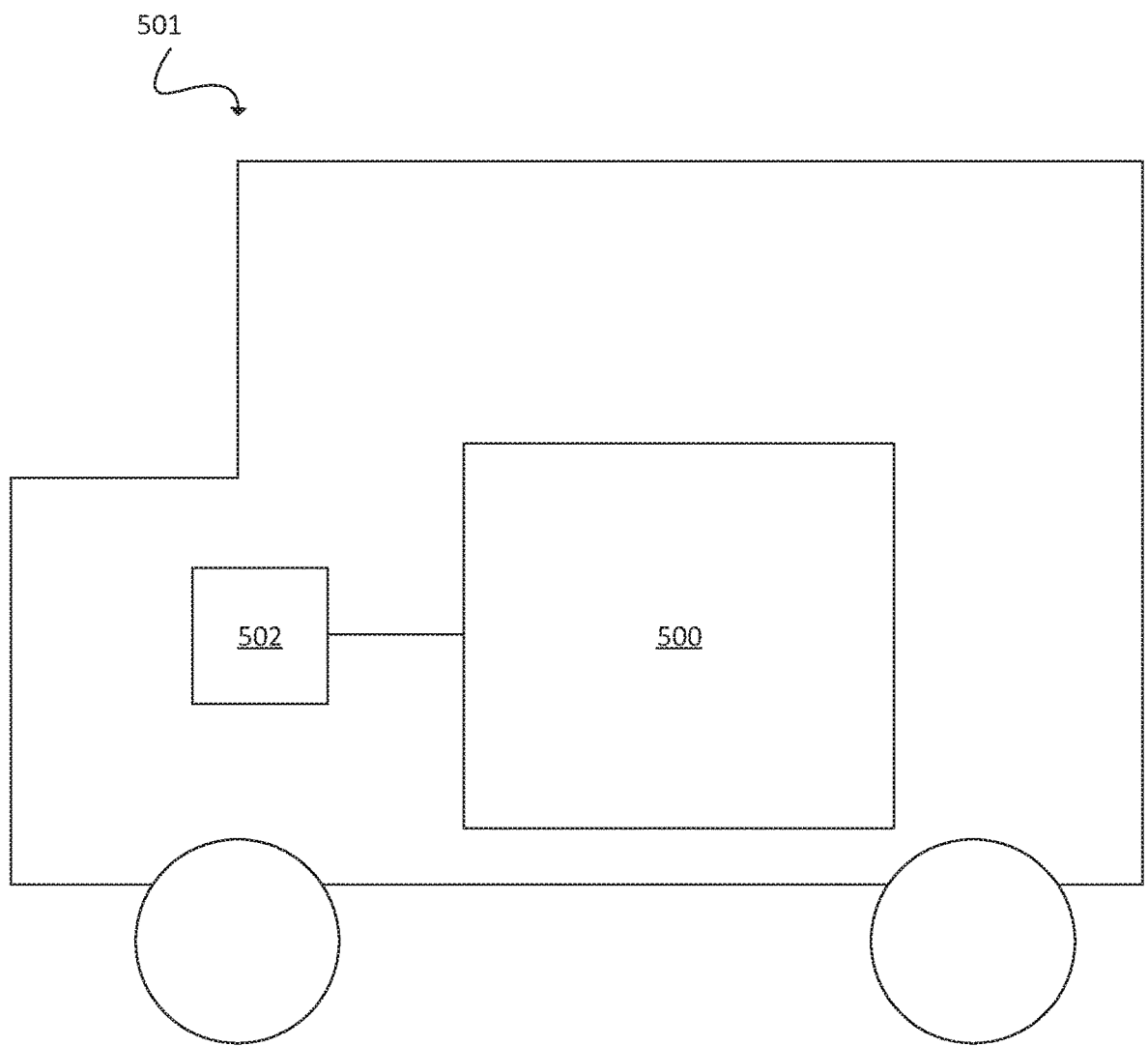
FIG. 7C shows an example schematic of an automobile with an engine and a system for treating automotive vehicle emissions.

FIG. 7C illustrates an automotive vehicle 501 with an engine 502 and the system 500 for treating automotive vehicle emissions on board an automotive vehicle.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An onboard automotive vehicle emissions treating system comprising:
    a solar panel configured to mount to an automotive vehicle, the solar panel configured to convert solar energy into electricity;
    an electrochemical cell configured to mount to the vehicle, the electrochemical cell coupled to the solar panel to produce a first stream of hydrogen gas using the electricity from the solar panel;
    a selective catalytic reduction unit configured to mount to the vehicle, the selective catalytic reduction unit coupled to the electrochemical cell to use a first portion of the hydrogen gas to catalytically reduce NOx in an engine exhaust gas emitted by an engine of the vehicle during operation of the vehicle; and
    a photo-assisted selective catalytic reduction unit coupled to the electrochemical cell and configured to catalytically reduce NOx in the engine exhaust gas using a second portion of the hydrogen gas and photons collected by the solar panel.

2. The system of claim 1, wherein the electrochemical cell is further configured to be coupled to the engine exhaust gas and receive water recovered from the engine exhaust gas.

3. The system of claim 1, wherein the solar panel further comprises solar to electricity conversion materials.

4. The system of claim 1, wherein the electrochemical cell is configured to be coupled to the engine of the vehicle and to direct a third portion of the first stream of hydrogen gas to the engine of the vehicle.

5. The system of claim 1, wherein the system is used in conjunction with at least one of a three way catalyst or an ammonia-based selective catalytic reduction unit.

6. A method for treating automotive vehicle emissions on-board an automotive vehicle, the method comprising:
    collecting, by a solar panel on the vehicle, solar energy;
    converting, by a photovoltaic cell, the solar energy into electricity;
    powering an electrochemical cell by the electricity from the photovoltaic cell;
    producing, by the electrochemical cell, a first stream of hydrogen gas;
    catalytically reducing, by a selective catalytic reduction unit, NOx in an engine exhaust gas using a first portion of the first stream of hydrogen gas; and
    directing a second portion of the first stream of hydrogen gas to a photo-assisted selective catalytic reduction unit coupled to the electrochemical cell and catalytically reducing NOx in the engine exhaust using the second portion of the hydrogen gas and photons collected by the solar panel.

7. The method of claim 6, wherein producing the first stream of hydrogen gas further comprises recovering water from the engine exhaust gas and electrolyzing the water to produce the first stream of hydrogen gas.

8. The method of claim 6, wherein collecting solar energy by the solar panel further comprises collecting solar energy by electricity conversion materials in the solar panel.

9. The method of claim 6, the method further comprising directing a third portion of the first stream of hydrogen gas to an engine of the vehicle.

10. An automotive vehicle comprising:
    an engine that emits engine exhaust gas during operation of the vehicle;
    a solar panel mounted to the vehicle, the solar panel configured to convert solar energy into electricity;
    an electrochemical cell mounted to the vehicle and coupled to the solar panel, the electrochemical cell configured to produce a first stream of hydrogen gas using the electricity from the solar panel;
    a selective catalytic reduction unit mounted to the vehicle, the selective catalytic reduction unit coupled to the electrochemical cell to catalytically reduce NOx in the engine exhaust gas using a first portion of the first stream of hydrogen gas; and
    a photo-assisted selective catalytic reduction unit coupled to the electrochemical cell and configured to catalytically reduce NOx in the engine exhaust gas using a second portion of the first stream of hydrogen gas and photons collected by the solar panel.

11. The vehicle of claim 10, wherein the electrochemical cell is further configured to be coupled to the engine exhaust gas and receive water recovered from the engine exhaust gas.

12. The vehicle of claim 10, wherein the solar panel further comprises solar to electricity conversion materials.

13. The vehicle of claim 10, wherein the electrochemical cell is configured to be coupled to an engine of the vehicle and to direct a third portion of the first stream of hydrogen gas to the engine of the vehicle.

14. The vehicle of claim 10, further comprising at least one of a three way catalyst or an ammonia-based selective catalytic reduction unit.

* * * * *

UNITED STATES PATENT AND TRADEMARK OFFICE
CERTIFICATE OF CORRECTION

| | |
|---|---|
| PATENT NO. | : 11,300,031 B2 |
| APPLICATION NO. | : 16/659358 |
| DATED | : April 12, 2022 |
| INVENTOR(S) | : Kalamaras et al. |

It is certified that error appears in the above-identified patent and that said Letters Patent is hereby corrected as shown below:

On the Title Page

Column 2 (item (57) Abstract), Line 3-4, delete "phototcatalytic" and insert -- photocatalytic --.

Signed and Sealed this
Eleventh Day of October, 2022

*Katherine Kelly Vidal*

Katherine Kelly Vidal
*Director of the United States Patent and Trademark Office*